Patented Sept. 24, 1946

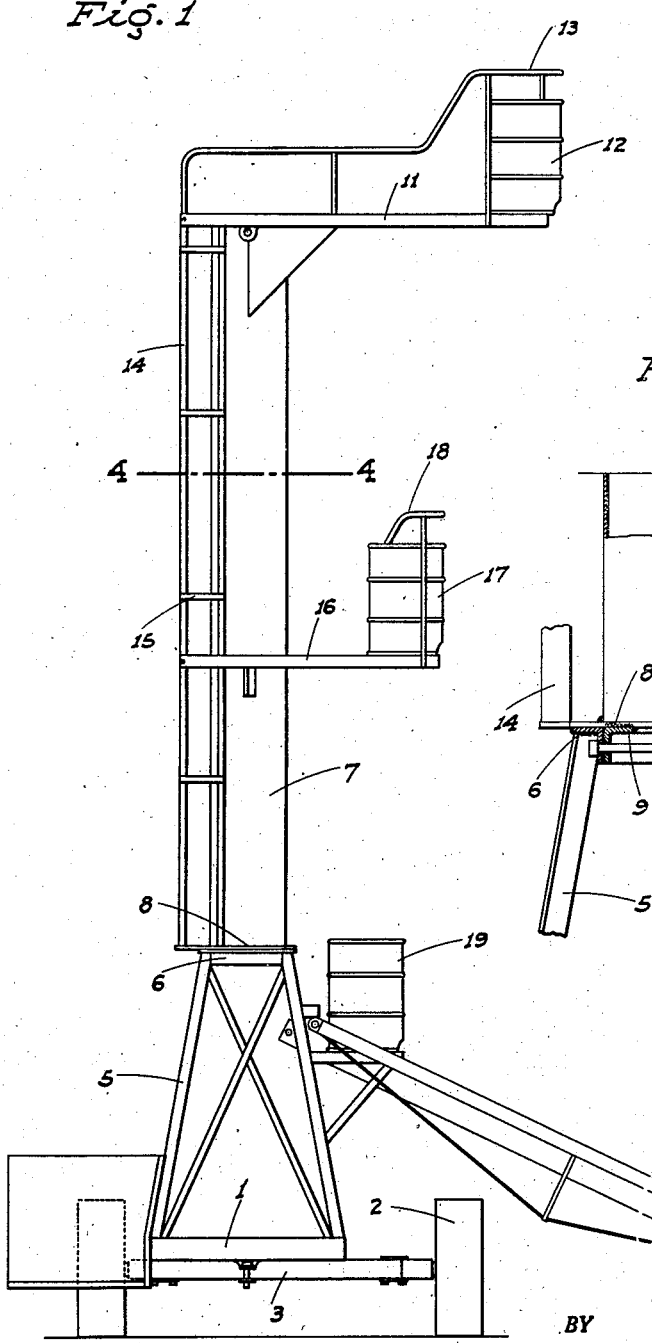
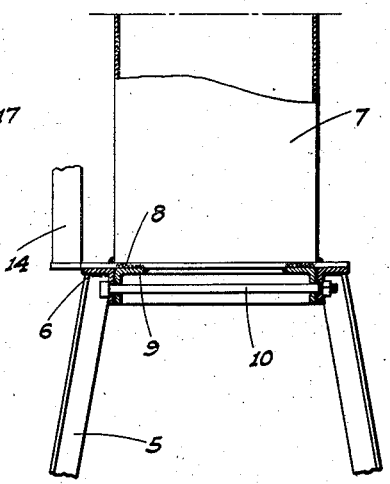

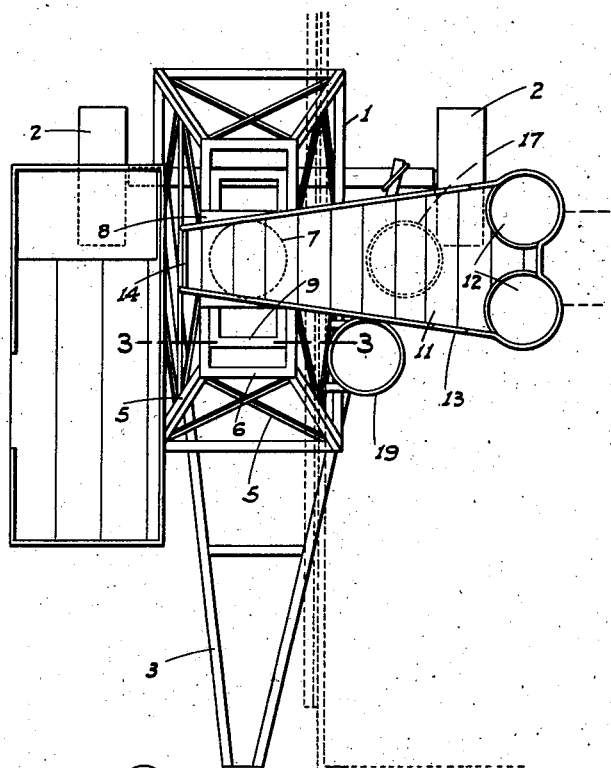
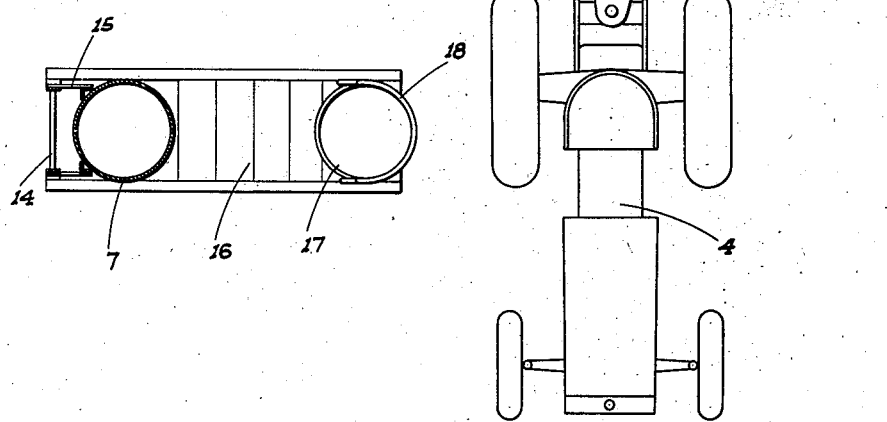

2,408,151

UNITED STATES PATENT OFFICE 2,408,151

TRANSPORT TOWER

Maxwell E. Phillips, Stockton, Calif.

Application September 5, 1945, Serial No. 614,504

5 Claims. (Cl. 304—9)

1

This invention relates to a tower of general utility in connection with orchards of all kinds. It is particularly directed to a tower for use in knocking nuts from trees, or spraying trees and similar operations which are carried on in connection with the general care of an orchard.

The primary object of the invention is to produce a tower having operator stations at different levels, and which stations are so arranged relative to each other as to conform to the general shape of a tree so that workers at the different stations are carried in close to the trees and can conveniently knock nuts therefrom, or conveniently, efficiently, and thoroughly spray all parts of the trees with a minimum of loss of spray material.

A further object of the invention is to build the tower of readily available material and of inexpensive construction; to make it demountable from the transport truck so that it may be readily transported from point to point over highways or otherwise, or for passing under low power and telephone lines and the like; to make it of round, barrel-like design as to all of its parts so that it may be crowded into trees with a minimum damage to limbs and twigs, since by reason of such round barrel-like design it will slide around the limbs and twigs instead of catching into and twisting and breaking the same; and, finally, the tower will have such rigid vertical strength and will be so balanced as to allow the operators' stations to be relatively offset to conform to the tree shape—a feature which has been found impossible of attainment with towers heretofore used.

A further object of the invention is to provide a simple and inexpensive transport tower, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Fig. 1 is a side elevation of the complete tower.

Fig. 2 is a top plan view of the same.

Fig. 3 is a sectional view taken on a line 3—3 of Fig. 2.

Fig. 4 is a sectional view taken on line 4—4 of Fig. 1.

Referring now more particularly to the characters of reference on the drawings, the machine comprises a platform or base 1 supported adjacent its rear end on a pair of wheels 2 and at its forward end is provided with a rigid tongue 3 swivelly connected, for relative horizontal swinging movement, to the rear end of a tractor 4. This draft tongue is centrally disposed relative to the wheel gauge, but the platform is so placed that its outer side is relatively close to the outermost wheel, as shown clearly in Figs. 1 and 2.

Upstanding from and rigid with the platform 1 is the main tower base 5, preferably of structural iron formation, on top of which is a rectangular open, horizontally disposed collar 6.

The main tower element 7 is of cylindrical form and of relatively light but strong material. At its lower end said tower element 7 is provided with a base plate 8 of larger area than the collar 6 and adapted to rest upon the latter. A flange unit 9 depends from the plate 8 and telescopically fits within said collar 6 and is removably secured therein by means of a removable bolt 10. A catwalk 11 is secured on and projects laterally inward from the top of the tower, and at its outer end supports a pair of cylindrical crow's-nests 12, about which catwalk and crow's-nests is a suitable guard rail 13.

A vertical ladder 14 extends along the full length of the tower and is suitably braced relative thereto by braces 15, which ladder 14 leads to the catwalk 11, as well as to the other catwalks hereinafter described.

Secured to the tower 7 at a point spaced below the catwalk 11 is another catwalk 16 of lesser length than such catwalk 11, and at the outer end of such catwalk 16 is a single crow's-nest 17 having a suitable guard rail 18.

Still another crow's-nest 19 is secured to the tower base 5 and projects from said base a distance which is laterally in from the plane of the crow's-nest 17. It will be apparent that the crow's-nests 19, 17, and 12 progressively extend further away from the tower as the height of the tower increases; the vertical space between the crow's-nests being greater than the height of any worker so that the worker in each crow's-nest may stand erect. By reason of the relative positioning of the crow's-nests at successively greater distances from the tower, the workers in the topmost crow's-nest are disposed close to the topmost branches of the tree about which the tower may be placed, and can conveniently see and knock nuts therefrom, while the workers in the crow's-nests below are similarly brought close to the lower branches for operation thereon. Likewise, when the tower is being used for spraying purposes this same arrangement permits close and effective spraying operations to be carried on throughout the tree area.

Although the crow's-nests may thus be brought very close to the trees, their circular form prevents any damage to projecting tree limbs or twigs with which they may come in contact, as such limbs and twigs will simply slide around the circular surfaces of these elements.

Due to the lateral offsetting of the supporting wheels relative to the overhanging crow's-nests as shown and described, the tower is stabilized and there is no tendency for the same to upset.

If relatively low trees are being worked on the main tower 7 may be removed, leaving the permanent crow's-nests 19 still remaining for the use of a single operator.

From the foregoing description it will be readily apparent that I have devised a tower of general utility in a nut or fruit orchard, and which is of the utmost simplicity but of a structure and design which gives it marked utility for the attainment of the objects of the invention as set forth herein.

Having thus described the invention, what I claim as new and useful and desire to secure by Letters Patent is:

1. A tower comprising a wheeled support, a main tower element projecting vertically from the support, a plurality of catwalks projecting outwardly at right angles to the tower element, the length of the catwalks progressively increasing from the lowest one to the uppermost one thereof, an operator's crow's-nest at the outer end of each catwalk, and a ladder mounted vertically along the tower element and leading to all the catwalks.

2. A structure as in claim 1 in which the tower element and the crow's-nests are all cylindrical in cross section.

3. Apparatus for use in nut harvesting including a tower, wheels supporting the tower for movement along the ground, a worker-support on top of the tower disposed laterally out from one side of the tower and a similar support fixed with the tower below the first support and disposed laterally out from said side of the tower but at a lesser distance therefrom than the first named tower.

4. Apparatus for use in nut harvesting including a tower, a pair of transversely spaced wheels supporting the tower for movement along the ground, vertically spaced operator supports fixed with the tower and disposed laterally out therefrom on one side; the tower at its base being laterally offset relative to a central longitudinal plane between the wheels in the direction opposite the offset of the supports.

5. Apparatus for use in nut harvesting including a tower, said tower including a base portion and an upper portion separate therefrom, wheels supporting the base portion for movement along the ground, means removably securing the base and upper tower portions together, and vertically spaced worker supports mounted on the tower in laterally offset relation thereto; one support being on the upper tower portion and the other on the base portion.

MAXWELL E. PHILLIPS.